Sept. 15, 1953     I. W. DOYLE     2,651,964
STRIP FILM MAGAZINE FOR CAMERAS
Original Filed March 23, 1946     5 Sheets-Sheet 5

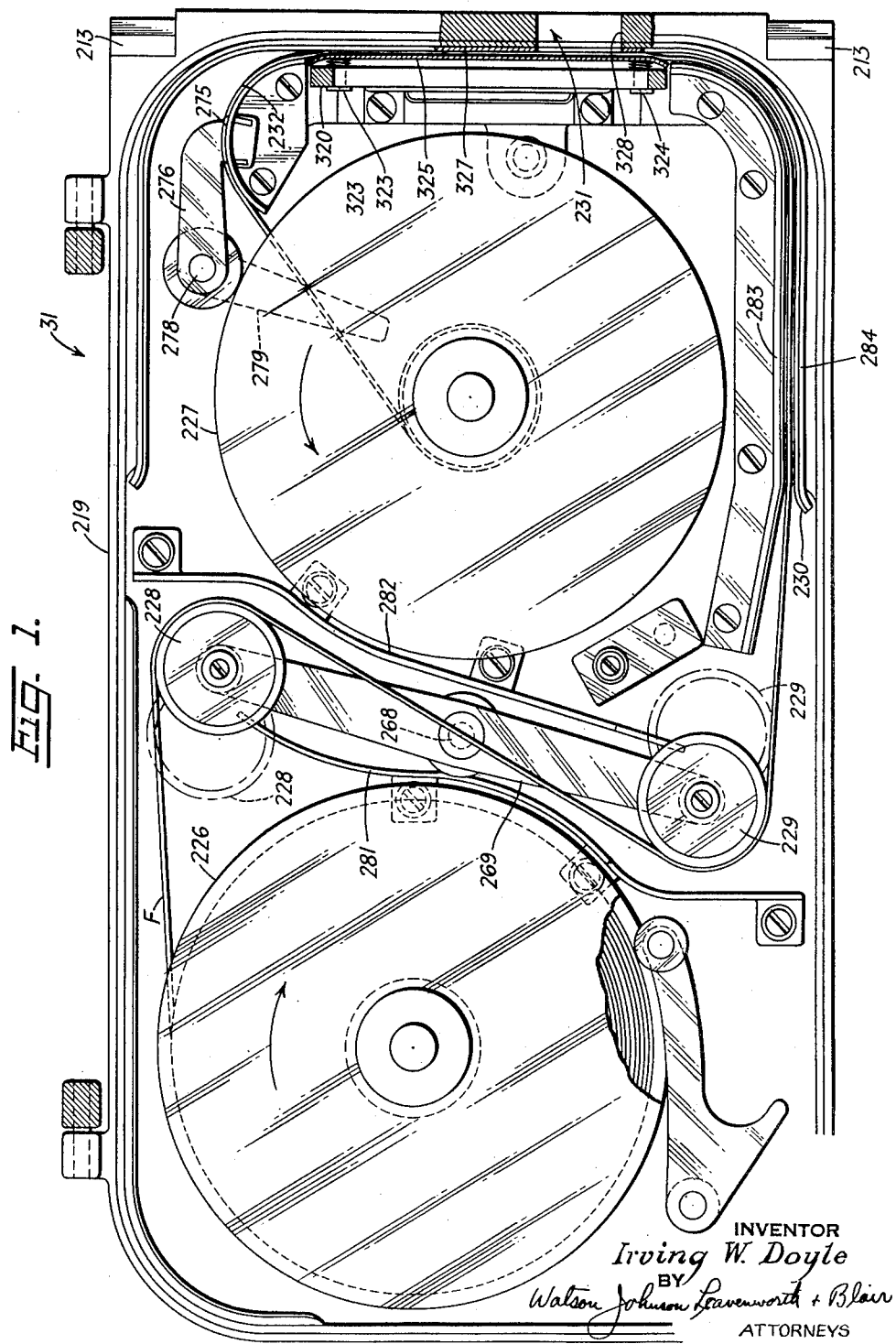

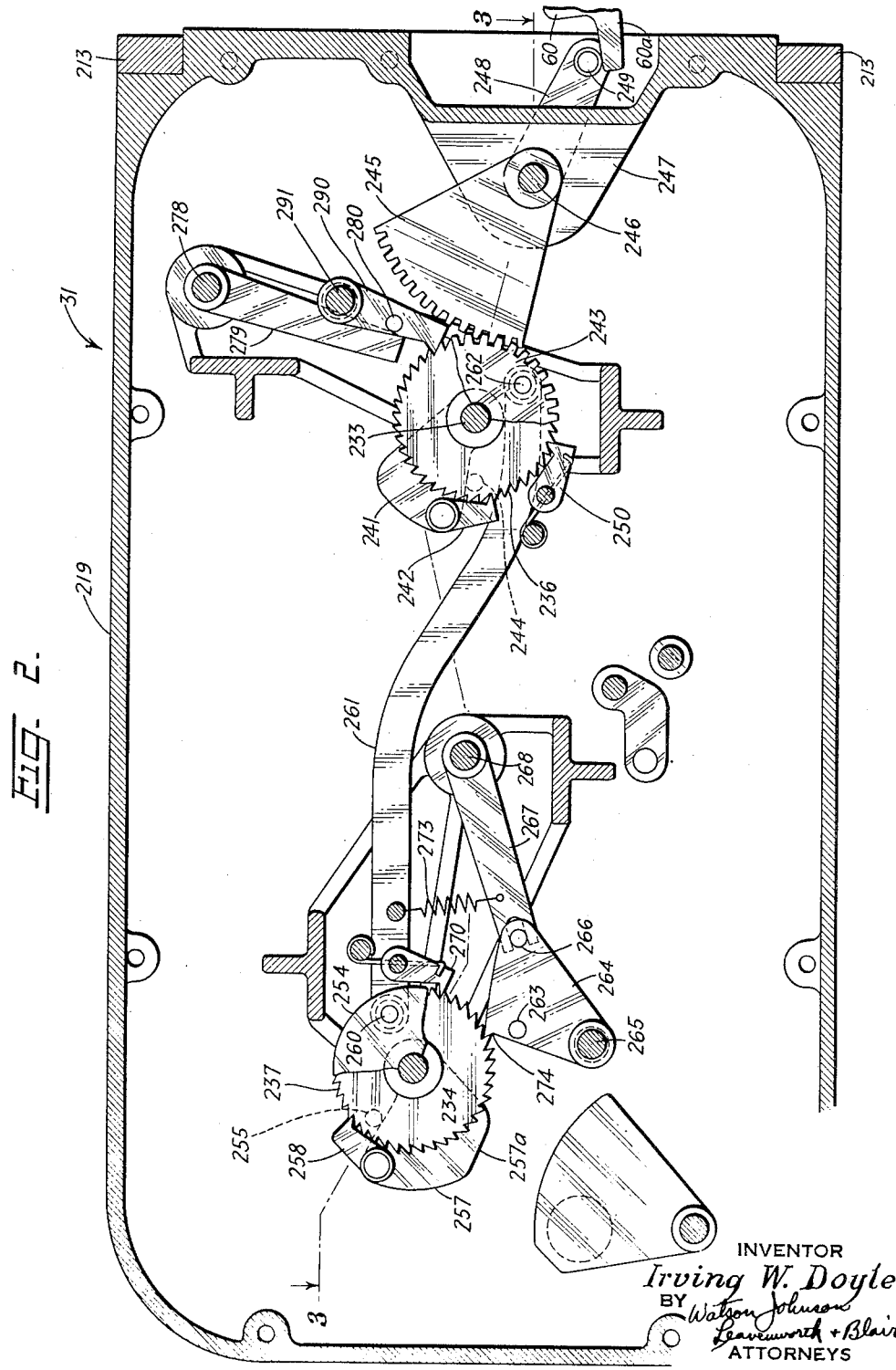

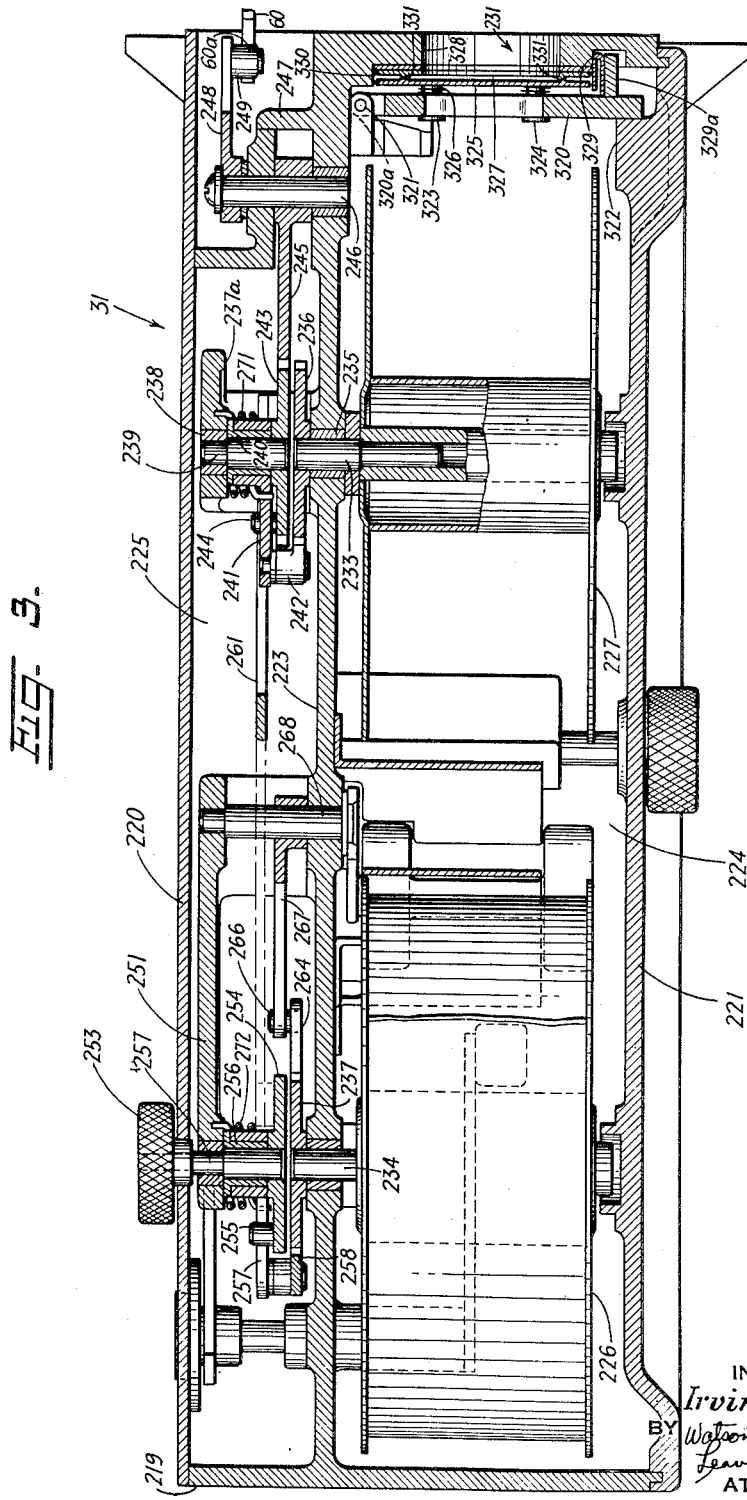

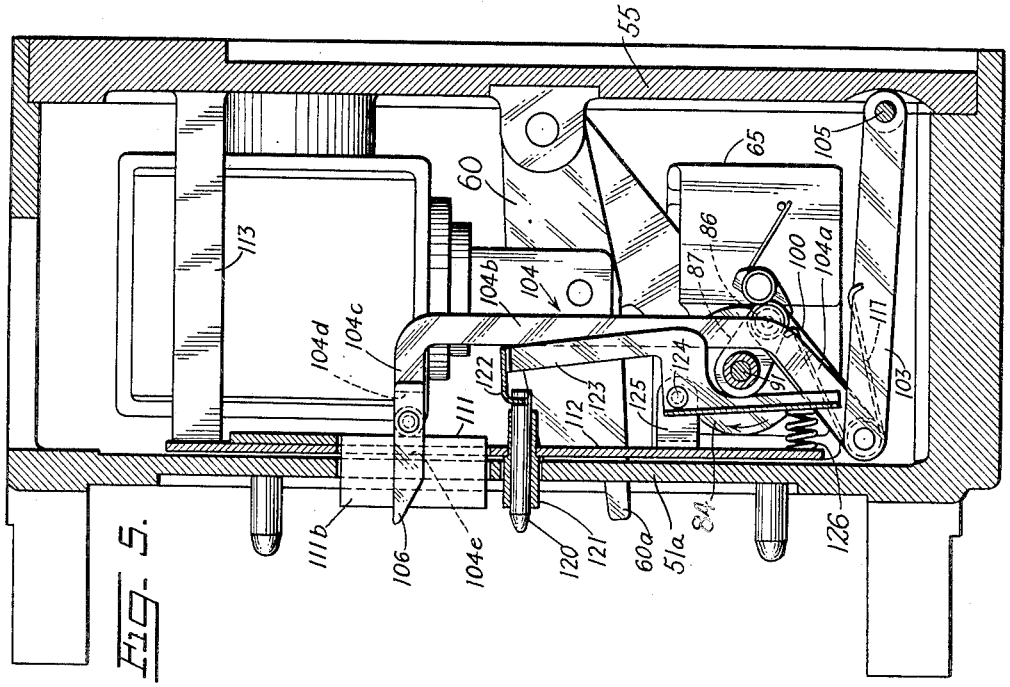
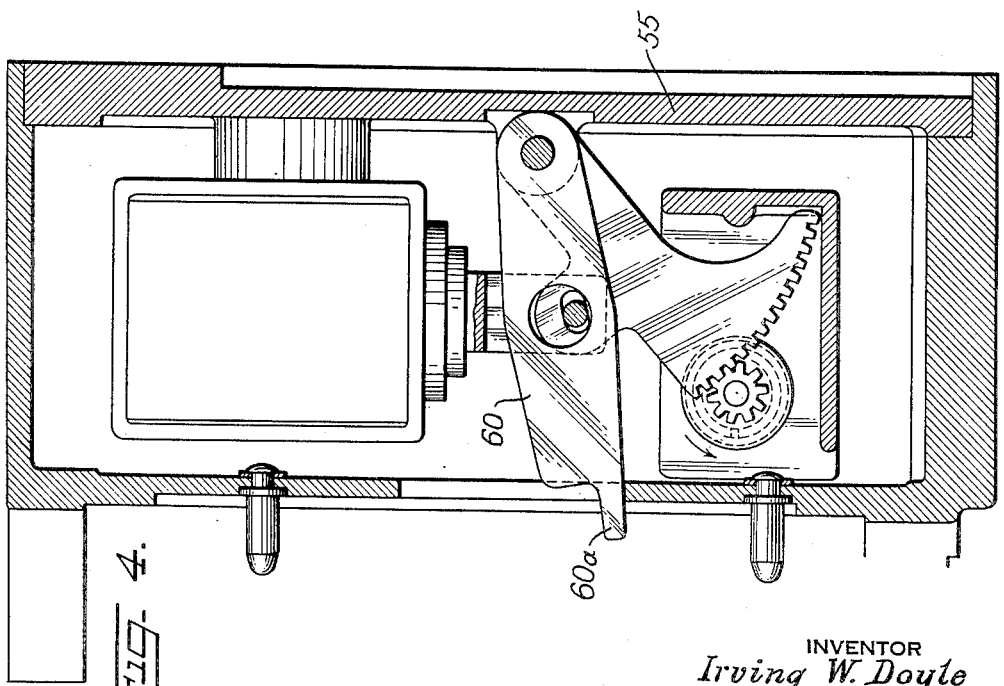

INVENTOR
*Irving W. Doyle*
BY
*Watson Johnson Leavenworth + Blair*
ATTORNEYS

Patented Sept. 15, 1953

2,651,964

UNITED STATES PATENT OFFICE 2,651,964

STRIP FILM MAGAZINE FOR CAMERAS

Irving W. Doyle, Massapequa, N. Y., assignor to Fairchild Camera and Instrument Corporation, Jamaica, N. Y., a corporation of Delaware Original application March 23, 1946, Serial No. 656,612, now Patent No. 2,537,040, dated January 9, 1951. Divided and this application October 10, 1950, Serial No. 189,375

5 Claims. (Cl. 88—17)

This invention relates to a method and apparatus for transporting photographic film, and is a division of the copending application of Irving W. Doyle et al., Serial No. 656,612, filed March 23, 1946, which issued on January 9, 1951, as U. S. Patent No. 2,537,040.

One of the objects of this invention is to supply a camera magazine for strip film which may be readily and easily loaded under adverse light conditions. Another object is to provide a magazine of the above nature, wherein the proper amount of film is unwound from the supply spool prior to the film transport portion of a cycle during which the film claws in the magazine pull the film through the film gate, thus relieving the film claws from the load of driving the supply spool during the film transport portion of the cycle. Another object is to provide a camera magazine of the nature wherein it is unnecessary accurately to register the film perforations with the film feeding claws or the film register pins. Other objects will be in part apparent, and in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the appended claims.

In the drawing, wherein I have shown one embodiment of my invention,

Figure 1 is a vertical, sectional elevation of the film magazine with the operative parts thereof being shown in their position just prior to their film transport movement;

Figure 2 is a sectional elevation, taken along a different line from that of Figure 1, to show additional operating parts of the magazine;

Figure 3 is a horizontal section taken along the line 3—3 of Figure 2;

Figure 4 is a sectional elevation of a portion of the magazine driving mechanism;

Figure 5 is a sectional elevation of a portion of the magazine driving mechanism, showing the film moving and registering means; and, Figure 6 is a sectional elevation of the magazine operating mechanism showing the film claws and film registering pins.

Similar reference characters refer to similar parts throughout the views of the drawing.

*Film magazine*

Figure 6:
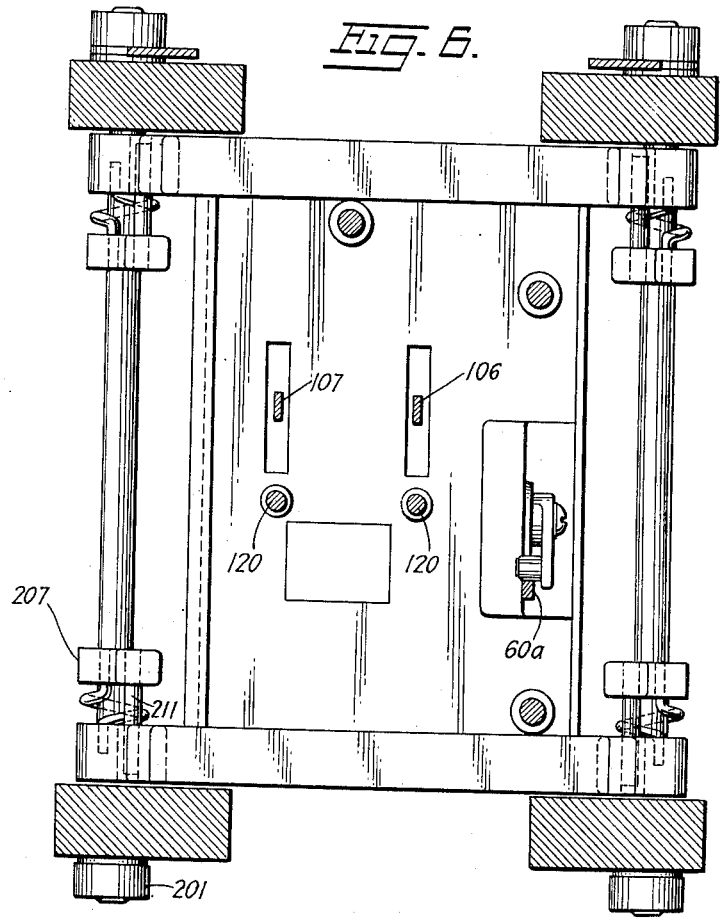

The magazine 31 comprises a housing 219, closed on one side by a detachable cover plate 220, and on the other side by a door 221 (Figure 3), a parallel partition 223 compartmenting the interior of the housing into chambers 224 and 225. The former of these chambers houses a film supply spool 226 and a film take-up spool 227, while the latter of the chambers houses mechanism operated by a solenoid operated link 60, as described in detail in the above-noted application, to feed film from the supply to the take-up spools.

As is more clearly shown in Figure 1, the film F from supply spool 226 is carried over a roller 228, down under another roller 229, through a film guide 230, thence through a film gate, generally indicated at 231, and over a guide 232, to take-up spool 227, to the core of which the end of the film is attached.

To facilitate loading magazine 31 with film under adverse light conditions, such as obtain in a dark room, a pair of baffles or guards 281 and 282 are disposed between supply and take-up spools 226 and 227, and secured to the side of the magazine housing in any suitable manner. The upper end of baffle 281 is suitably slotted to accommodate movement of roller 228 between its full and dotted line positions, which movement is for a purpose hereinafter described, the lower end of baffle 282 being similarly slotted to permit similar movement of the lower roller 229. These baffles 281 and 282 accordingly define a path of movement for the film between the two spools, and at the same time define an area readily discernible by touch in the dark, which materially facilitates loading of the film in the magazine.

Film guide 230 may include opposed suitably formed or curved plates 283 and 284, spaced sufficiently to provide a film channel of a width slightly in excess of that of the thickness of the film, so that the film may be loaded into the guide sideways, rather than being threaded therethrough end first. In similar manner, guide plate 232 may readily be identified by touch, and the film slid laterally thereover. Thus it follows that by the arrangement of the hereinbefore described baffles and film guides, it is but a simple matter to load the magazine with film in the dark, and without the necessity of properly positioning the film on sprockets to form loops, as is customary in conventional magazines.

During the film feeding cycle, as will be described in detail hereinbelow, the rollers 228 and 229 are displaced from their full to the dotted line positions, to create slack in the film during that portion of the complete cycle of operation during which the film claws, described in detail in the above-noted application, are drawn to the bottom of their stroke. Accordingly, during the film transporting stroke of the film claws, they merely feed the slack film thus created, and accordingly do not have to drive the supply spool 226 through the medium of the film.

The take-up and supply spools 227 and 226 (Figure 3) are mounted respectively on shafts 233 and 234. The bottom ends of these shafts, as viewed in Figure 3, are received in the spool cores to which they are keyed or otherwise connected, so that rotation of the shafts effects rotation of the spools. The upper end of shaft 233 is journaled by a bushing 235 pressed into partition 223, and has attached to its extremity a ratchet wheel 236. The upper end of shaft 234 is similarly journaled in partition 223 and also has fastened to its extremity a ratchet wheel 237.

Enclosed within and attached to the housing of magazine 31 is a strut 237a which carries a bushing 238, into which the reduced end of a stud shaft 239 is rotatably mounted. The exposed end of this shaft has attached thereto a bushing on which is rotatably mounted a pawl carrier 241 which, as is more clearly shown in Figure 2, has a pawl 242 pivotally mounted thereon. This pawl is spring-biased counterclockwise into engagement with ratchet wheel 236 so as to rotate the ratchet counterclockwise when the pawl carrier is similarly rocked.

Referring back to Figure 3, it may be seen that the lower extremity of stud shaft 239 has fastened thereto a gear 243 from which extends a pin 244, adapted to engage pawl carrier 241 during the first portion of the film feeding cycle. This gear 243 (Figure 2) meshes with a gear sector 245 pivotally attached as by a pin 246 to an integral portion 247 of the magazine housing. Also attached to this pin, which is pivotable relative to the housing, is a crank arm 248 (see also Figure 2) the free end of which has a pin 249 extending therefrom. This latter pin overlies a finger 60a which projects from the end of link 60, and thus receives a driving impulse therefrom when the link is driven.

From the above, it may be seen that when link 60 is rocked upwardly, crank arm 248, and accordingly gear sector 245, are rocked counterclockwise, the sector thus driving gear 243 clockwise. As gear 243 is rotated clockwise, its pin 244, which underlies pawl carrier 241, rotates with it, and accordingly forces pawl carrier 241 in a clockwise direction also.

When the driving means (not shown, but shown and described in the aforesaid application) for link 60 is deenergized, which accordingly permits link 60 to drop away from pin 249 to the position shown in Figure 2, pawl 242 drives ratchet wheel 236, thus to rotate take-up spool 227 (Figure 1) to take up the film transported by the film feeding claws in the camera. Reverse rotation of ratchet 236 is prevented by a spring-biased pawl 250, pivotally carried by the magazine casing.

As shown in Figure 3, another strut 251 within the camera housing rotatably supports a shaft 252, to the outer end of which is attached a knurled knob 253, and to the inner end of which is fastened a disc 254, which carries a pin 255. Also mounted on shaft 252 is a bushing 256, rockably mounting a pawl carrier 257, whose pawl 258 (see Figure 2) is spring-biased into engagement with ratchet wheel 237. As noted above, this ratchet wheel is attached to shaft 234 which, as hereinbefore noted, is keyed to the core of film supply spool 226. Disc 254 (Figure 2) has pivotally attached thereto, as by a pin 260, one end of a link 261, the other end of which is attached to gear 243 by a pin 262. It may now be seen that when gear 243 is rotated in the manner hereinbefore described, disc 254 is driven counterclockwise by link 261. As the disc rotates counterclockwise, its pin 255 engages pawl carrier 257, thus driving the pawl carrier counterclockwise also.

As pawl carrier 257 continues to rotate counterclockwise, a cam surface 257a formed thereon ultimately engages a pin 263 carried by a lever 264, pivoted on a pin 265, projecting from one wall of the camera housing. The engagement of the cam surface with pin 263 rocks lever 264 clockwise, so that another pin 266 carried thereby and extending through the bifurcated end of a fork 267 rocks the fork counterclockwise. This fork is attached to a shaft 268, to which is also attached an arm 269 (Figure 1), on the extremities of which rollers 228 and 229 are rotatably mounted. Thus when fork 267 (Figure 2) is rocked counterclockwise, so also are shaft 268 and arm 269 (Figure 1), thus moving the rollers to the broken line positions shown, and accordingly creating slack in the film.

This slack, as pointed out above, is taken up when the film is transported through film gate 231 by the camera film claws. Ratchet wheel 237 is also provided with a spring-biased pawl 270 (Figure 2) to prevent reverse rotation thereof.

When actuating link 60 moves to the position shown in Figure 2, pawl carriers 241 and 257 are respectively driven counterclockwise and clockwise, to rotate the take-up and supply spools. To this end, as shown in Figure 3, a spring 271 is coiled around the hub of pawl carrier 241, in which is anchored one end of the spring, the other end being anchored in strut 237. Likewise, a spring 272 has one end anchored in pawl carrier 257, and the other in strut 251. Both of these springs are tensioned when the pawl carriers are positively driven, in the manner hereinbefore described, and accordingly drive the pawl carriers in the opposite direction when they are free to do so upon movement of link 60 to its Figure 2 position, thus to rotate take-up spool 227 (Figure 1) counterclockwise, and supply spool 226 clockwise. At the same time, pawl carrier 257 (Figure 2) is withdrawn from pin 263 on lever 264 so that under the bias of a spring 273 connected between link 261 and fork 267, lever 264, fork 267, shaft 268 and arm 269 (Figure 1) may be pulled in directions opposite to those in which they were driven, thus to return rollers 228 and 229 to their full line positions. As this occurs, slack film created between the two film spools, when the supply spool was rotated, is taken up by rollers 228 and 229. This action of arm 269 continues until lock pawl 274 on arm 264 (Figure 2) engages ratchet wheel 249 to stop any further rotation thereof.

As the slack film between the film spools is transported through film gate 231 by the camera film claws (not shown), a loop of film is formed above guide plate 232. When, however, the film lies flush against this guide plate, it also overlies a bent-out ear 275 of an arm 276, fastened to a rockable shaft 278, which also has fastened thereto a finger 279. This arm and finger are under constant counterclockwise bias of a spring (not shown), so that when the aforementioned loop of film is formed, through the action of the film transporting claws, arm 276 and finger 279 are free to swing counterclockwise in the film loop. As they do so, the lower end of finger 279, as shown in Figure 2, engages a pin 280 carried by a locking pawl 290 pivoted as at 291, and adapted to engage and lock ratchet wheel 236 when the several parts are in the position shown. When, however, finger 279 swings counterclockwise, as noted, it forces locking pawl 290 counterclockwise also, out of engagement with ratchet wheel 236. When, however, the take-up spool 227 (Figure 1) is driven to take up slack film after the film transport portion of the cycle, it flattens out the film loop created over guide plate 232, and in so doing rocks arm 276 and accordingly finger 279 clockwise against the bias of their spring. In so doing, finger 279 (Figure 2) permits locking pawl 290, which is spring-biased clockwise, to reengage ratchet wheel 236 and prevent further rotation thereof.

*Film gate*

Film gate 231 (Figure 3) comprises an apertured carrier plate 320 hingedly attached as at 321 to the magazine housing structure so that it can be readily folded back, i. e. swung clockwise, for ease of loading. A suitable spring 320a is attached to the pivot of carrier plate 320 to effect counterclockwise return thereof after the film is loaded, a boss 322 being provided on door 221 for positively holding the gate in closed position when the door is closed. These parts are so constructed as to preclude complete closing of the door unless plate 320 is in its proper operative position.

Plate 320 reciprocably receives a plurality of headed pins 323 and 324, on the right-hand ends of which is mounted a pressure plate 325, springs 326 being disposed about pins 323 and 324 between plates 320 and 325 to urge the pressure plate to the right toward an aperture plate 327. Aperture plate 327 is secured in any suitable manner to the magazine housing so that its aperture registers with an aperture 328 formed in the housing. Pins 323 and 324 are so dimensioned that they position pressure plate 325 closely adjacent aperture plate 327, while leaving sufficient clearance between the two plates for the passage of film. At one side of the film passage is a spring 329 mounted on a shelf 329a carried by plate 320 and adapted to engage one edge of the film and press the opposite edge thereof against a guide portion 330 of the magazine housing, thus accurately to position the film sideways. Pressure plate 325, aperture plate 327 and the other various film guide plates throughout the magazine are provided with raised runners 331 which engage and guide the film near the outside edges thereof, thus allowing the center portion of the film to move through the magazine without touching any part thereof, thereby to prevent scratching of the film, and also to reduce friction.

*Magazine operation*

While the over-all operation of the magazine will be apparent from the foregoing, it might be well to summarize a complete cycle. When the camera is in condition to transport film for the succeeding cycle, all parts of the magazine are in the positions shown in Figures 1, 2 and 3. Thus, when link 60 (Figure 2) is actuated, it effects counterclockwise rotation of sector 245, and accordingly clockwise rotation of gear 243. Through the action of link 261, disc 254 is rotated counterclockwise also. Pin 244 on gear 243 rotates pawl carrier 241, and accordingly pawl 242 clockwise, while pin 255 on disc 254 rotates pawl carrier 257 and accordingly pawl 258 counterclockwise. As pawl carrier 257 rotates counterclockwise, its cam portion 257a ultimately engages pin 263, rotating lever 264 slightly clockwise, and accordingly rocking film roller arm 269 (Figure 1) counterclockwise, thus carrying rollers 228 and 229 to their broken line positions to leave some slack in the film.

At the end of the actuation of link 60, the camera mechanism goes through its operative cycle (as described in the aforesaid application) and the film claws, as will be described, push the film upwardly the required amount. This occurs with great rapidity, and during the course of the cycle the slack film between the film spools is fed through the film gate and a loop of film is formed over guide plate 232 (Figure 1). At the same time, link 60 (Figure 2) returns to the position shown, so that spring 271, which was tensioned during the clockwise rotation of pawl carrier 241 (Figure 3) is then free to drive pawl carrier 241 (Figure 2) counterclockwise, causing pawl 242 to drive ratchet wheel 236 and shaft 233 counterclockwise, thus to take up the slack film, i. e. the loop of film, over guide plate 232. As this slack film is taken up, the film presses downwardly on arm 276 (Figure 1) permitting locking pawl 290 (Figure 2) to engage ratchet wheel 236 and stop further rotation. This lock remains engaged with the ratchet wheel until the next cycle, at which time the film is again moved through the film gate to create a new slack loop over guide plate 232. At the same time, finger 279, under the bias of its spring, disengages locking pawl 290. Also, at the time the slack film is taken up on the take-up spool, spring 272, which was tensioned during the clockwise movement of pawl carrier 257 (Figure 3), rotates pawl carrier 257 (Figure 2) and pawl 258 clockwise, driving ratchet wheel 237 and shaft 234 and accordingly supply spool 226 in the same direction to feed a new slack loop between the two film spools for the following cycle. As this new slack loop of film is fed off, spring 273 (Figure 2) rocks arm 269 (Figure 1) clockwise to the solid line position, at which time locking pawl 274 (Figure 2) engages ratchet wheel 237 to prevent further rotation of the feed spool. In this way, after each operation of the magazine, a new slack loop of exactly the right amount of film is created so that during the succeeding cycle the film claws have to move only a relatively small length of film, rather than drive the supply spool 226 together with the film carried thereby.

It may now be seen that with a magazine of this nature several definite and real advantages inhere. As noted, the magazine may be readily and easily loaded under adverse light conditions, as there are no sprockets to which the film must be fitted and no guides through which the film must be threaded endwise. Rather the film may be easily slid laterally into or over the various guides and film gate with all risk of improper loading precluded by baffles 281 and 282 (Figure 1). Also by reason of the automatic film feeding characteristics of the magazine mechanism, whereby just the proper amount of film is unwound from the supply spool prior to the film transport portion of the cycle during which the film claws in the magazine pull the film through the film gate, there is no need to form film loops in the magazine at loading time, thus precluding the possibility of improper loading, nor do the film claws have to drive the supply spool and associated mechanism.

It should also be noted that when the magazine is loaded, it is unnecessary accurately to register the film with respect to magazine aperture 328, the film claws, or the film register pins (to be described below), as the claws and pins are spring-loaded in the direction of engagement with the film. Thus if the film perforations are not in register with the film claws or register pins when the magazine is attached to the camera body, they will merely be pushed back without damage either to them or the film, and will ultimately engage the film, i. e. enter the perforations therein when the camera is actuated.

It may now be seen that in the operation of the magazine after the supply spool 226 has been installed and the film F has been passed around rollers 228 and 229, through the guides and film gate, and the leading end attached to take-up spool 227, an accurate, predetermined amount of film is metered from the supply spool 226 and is stored between the supply and take-up spools, remote from the camera aperture so as to be readily available for subsequent feeding movement of the film by the film claws across the aperture. Thus, when the film claws draw the film across the aperture, as described hereinbelow, the only load on the claws is the mass of the stored film. This, of course, permits of economical, light-weight construction and accurate, high-speed operation of the film claws during successive operative cycles.

The mechanism for operating link 60 and for driving the film claws and film register pins includes a crank pin 86 (Figure 5) which is driven by the driving mechanism disclosed and described in detail in the aforesaid application. Crank pin 86 is fastened to a crank arm 87 which, in turn, is fastened to a bushing 90 secured to one end of a shaft 91. The other end of this shaft carries a similar bushing and crank arm (not shown). Crank pin 86 pivotally supports one end of a link 100, to the lower end of which a lever 103 and an arm 104 are pivotally attached. A similar arm and lever (not shown) are similarly attached to the crank arm mounted on the other end of shaft 91. Indeed, the lever systems on both ends of shaft 91 are similar, so only that shown in Figure 5 will be described herein. For a detailed description of the structure and operation of the counterpart of this lever system, reference is made to the aforementioned application. The right-hand end of lever 103, as shown in Figure 5, is pivotally secured as by a pin to cover plate 55. Arm 104 includes a rearwardly extending portion 104a, a vertical portion 104b, and a horizontal portion 104c, which is bent transversely, as at 104d, and thence frontwardly as at 104e to terminate in a pointed film claw 106 (see also Figure 6). The counterpart of arm 104 is similarly formed, thus terminating in another pointed film claw 107.

Secured to the forwardly extending portion 104e of arm 104 is a roller adapted to ride against a guide plate 111 secured to a front mounting plate 112, in turn secured at the top and bottom, respectively, to a pair of forwardly extending arms, one of which is shown at 113 in Figure 5. These arms are preferably integral with cover plate 55. Front plate 112 has a pair of rectangular cutouts, one of which is shown at 116, through which project forwardly extending portions of guide plate 111. The other cut-out (not shown) similarly receives forwardly projecting portions of the counterpart (not shown) of guide plates 111. These forwardly extending portions of the two pairs of guide plates are spaced, and accordingly provide guide slots respectively for film claws 106 and 107.

As the two film transporting claws 106 and 107 operate in unison, it will suffice to describe the operation of claw 106. Thus, when crank arm 87 (Figure 5) is rotated in the manner described in the above-mentioned application, it revolves clockwise, as viewed in this figure, thus driving link 100 downwardly to depress lever 103. As this lever is depressed, arm 104 and accordingly film claw 106 on the end thereof is drawn downwardly. It might here be noted that each arm and lever set, e. g. arm 104 and lever 103, are biased away from one another by a suitably arranged spring 117, the other arm and lever set being similarly biased apart by a similar spring (not shown), these springs thus maintaining the film claw rollers, such as roller 109 in engagement with their respective sets of guide plates, and accordingly tending to force the film claws into the perforations of the film. During the downward stroke of the film claws, as described, they ratchet past the film perforations as they are drawn downwardly in a direction opposite to the direction to which the film is to be transported. Thus, at the end of about 90° of angular movement of crank arm 87 and its counterpart, the two sets of links, levers and arms, e. g. link 100, lever 103 and arm 104, commence to move upwardly with the film claws extending through opposed film perforations. As the film claws are moved upwardly, the film is transported by an amount equivalent to the full stroke of the claws, after which the crank arms again draw the claws downwardly until they arrive at the rest position shown in Figure 5.

In order to assure that each successive frame of the film is properly located in relation to the camera lens, there is provided a film registering device, which also serves the added purpose of maintaining the film motionless during the exposure period. This device includes a pin 120 (Figure 5) which is reciprocably mounted in a bushing 121 extending through the front wall 51a of camera housing 51, and is carried by front plate 112. The inner end of pin 120 is slotted to receive the bent down end of an arm 122, whose other end is fastened to the top of a rocker arm 123, pivotally mounted as at 124 on the free end of a lug 125, secured to and extending inwardly from front plate 112. The lower end 123a of rocker arm 123 carries one end of a spring 126, the other end of which abuts and is carried by front plate 112, spring 126 thus putting the rocker arm under a constant counterclockwise bias, as viewed in Figure 5. Shaft 91 carries a cam (not shown) adapted to engage a button (not shown) mounted on lower end 123a of rocker arm 123, so that when the cam rotates with shaft 91 during the film transport portion of the operative cycle, the cam rocks rocker arm 123 clockwise, as viewed in Figure 5, so that pin 120 is withdrawn from that perforation of the film through which it extended prior to the beginning of the film transport portion of the cycle. The construction and operation of this cam is described in detail in the aforementioned application.

In other words, the registering pin 120 is withdrawn during the first 90° of movement of crank arm 87 during which the film claws are being drawn downwardly so that the film does not start to move until the registering pin, of which there are two, incidentally, as shown in Figure 6, is withdrawn from the film. In connection with the operation of the film claws and film registering pins, it should be noted that the film magazine is conditioned for operation by the upward movement of fork 68 (Figure 4) during the initial portion of the operative cycle, as was pointed out hereinabove.

It may now be seen that through the provision of film claws and registering pins of the nature described, accurate initial registry of the film perforations is unnecessary and the necessity for sprockets or similar devices is obviated.

As many possible embodiments may be made of the mechanical features of the above invention, and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In a strip film magazine for a camera, the combination of, a casing, film supply and take-up spools rotatably mounted in said casing, a pair of ratchets respectively connected to said spools, a pair of members rotatably mounted in said casing respectively adjacent said ratchets, a pair of pawls pivotally mounted in said casing and respectively in ratcheting engagement with said ratchets so as to drive said ratchets upon operation of said pawls in one direction, a loadable spring connected to each of said pawls and biasing them in ratchet driving direction of movement, a driving connection between respective members and pawls adapted to drive said pawls in a spring loading direction upon operation of said members in one direction, and means operated by the camera for driving both of said members in spring-loading direction and which upon release allows said springs to drive said pawls and accordingly said ratchets.

2. In a strip film magazine for a camera, the combination of, a casing, film supply and take-up spools rotatably mounted in said casing, a pair of ratchets respectively connected to said spools, a pair of members rotatably mounted in said casing respectively adjacent said ratchets, a pair of pawls pivotally mounted in said casing and respectively in ratcheting engagement with said ratchets so as to drive said ratchets upon operation of said pawls in one direction, a loadable spring connected to each of said pawls and biasing them in ratchet driving direction of movement, a driving connection between respective members and pawls adapted to drive said pawls in a spring loading direction upon operation of said members in one direction, and means operated by the camera for driving both of said members in spring-loading direction and which upon release allows said springs to drive said pawls and accordingly said ratchets, said driving means including an elongated driving link in said casing interconnecting said members so that both move in unison upon operation of said driving means.

3. Apparatus in accordance with claim 2 wherein one of said members is in the form of a gear and said driving means includes an oscillatable gear sector in mesh with said gear.

4. Apparatus in accordance with claim 1 wherein means are operatively associated with that one of said ratchets connected to the supply spool for holding the supply spool against rotation after a predetermined amount of film has been withdrawn therefrom.

5. In a strip film magazine for a camera, the combination of, a casing, film supply and take-up spools rotatably mounted in said casing, a pair of ratchets respectively connected to said spools, a pair of members rotatably mounted in said casing respectively adjacent said ratchets, a pair of pawls pivotally mounted in said casing and respectively in ratcheting engagement with said ratchets so as to drive said ratchets upon operation of said pawls in one direction, a loadable spring connected to each of said pawls and biasing them in ratchet driving direction of movement, a driving connection between respective members and pawls adapted to drive said pawls in a spring loading direction upon operation of said members in one direction, means operated by the camera for driving both of said members in spring-loading direction and which upon release allows said springs to drive said pawls and accordingly said ratchets, an arm pivotally mounted in said casing between said spools and having a film guiding element on each end over which the film is trained, said arm being rockable by the film upon feeding movement thereof, a spring loaded upon feeding movement of the film for rocking said arm subsequent to rotation of said supply spool to take up slack film created thereby, and means connected to said arm and operatively associated with the supply spool ratchet and accordingly with the supply spool to lock the supply spool after predetermined film supplying rotation thereof.

IRVING W. DOYLE.

References Cited in the file of this patent

UNITED STATES PATENTS

| Number | Name | Date |
|---|---|---|
| 1,914,214 | Porter | June 13, 1933 |
| 1,942,891 | Wittel | Jan. 9, 1934 |
| 2,060,922 | Black et al. | Nov. 17, 1936 |
| 2,163,179 | Porter | June 20, 1939 |
| 2,165,706 | Howell | July 11, 1939 |
| 2,184,003 | Parker et al. | Dec. 19, 1939 |
| 2,284,487 | Hineline | May 26, 1942 |
| 2,321,812 | Heller et al. | June 15, 1943 |
| 2,326,654 | Jagust | Aug. 10, 1943 |
| 2,342,509 | Gaty et al. | Feb. 22, 1944 |

FOREIGN PATENTS

| Number | Country | Date |
|---|---|---|
| 895,197 | France | Mar. 27, 1944 |